United States Patent
Piper et al.

(10) Patent No.: US 9,669,822 B2
(45) Date of Patent: Jun. 6, 2017

(54) METHOD AND APPARATUS FOR CONTROLLING OPERATION OF AN INTERNAL COMBUSTION ENGINE FOR A MULTI-MODE POWERTRAIN SYSTEM

(71) Applicant: GM GLOBAL TECHNOLOGY OPERATIONS LLC, Detroit, MI (US)

(72) Inventors: Eric Piper, Fenton, MI (US); Anthony H. Heap, Ann Arbor, MI (US); John Janczak, Commerce Township, MI (US); Samantha Victoria Lado, Pittsfield Township, MI (US); Yaoyao Wei, Ann Arbor, MI (US); Kee Yong Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 14/737,615

(22) Filed: Jun. 12, 2015

(65) Prior Publication Data

US 2016/0362100 A1    Dec. 15, 2016

(51) Int. Cl.
*B60W 10/06* (2006.01)
*B60W 10/08* (2006.01)
*B60W 20/17* (2016.01)

(52) U.S. Cl.
CPC ............ *B60W 20/17* (2016.01); *B60W 10/06* (2013.01); *B60W 10/08* (2013.01); *B60W 2400/00* (2013.01); *B60W 2510/244* (2013.01); *B60W 2520/10* (2013.01); *B60W 2710/0666* (2013.01); *B60W 2710/083* (2013.01); *Y10S 903/905* (2013.01); *Y10S 903/906* (2013.01); *Y10S 903/907* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 2009/0210108 A1* | 8/2009 | Okubo | ................... | B60K 6/445 |
| | | | | 701/22 |
| 2010/0063658 A1* | 3/2010 | Martin | ................... | B60K 6/365 |
| | | | | 701/22 |
| 2014/0330466 A1* | 11/2014 | Bureau | ................... | B60K 6/48 |
| | | | | 701/22 |

* cited by examiner

*Primary Examiner* — Mussa A Shaawat
*Assistant Examiner* — Abdhesh Jha
(74) *Attorney, Agent, or Firm* — Quinn IP Law

(57) ABSTRACT

A multi-mode powertrain system is described, and includes an internal combustion engine and electric machines operative to transfer mechanical power through a gear train to an output member coupled to a driveline, wherein the electric machines electrically connect to a battery. The method includes determining an audible noise-based maximum engine speed, wherein the internal combustion engine generates an audible noise that is less than a threshold noise level when operating at a speed that is less than the audible noise-based maximum engine speed. The electric machines and the internal combustion engine are controlled responsive to an operator torque request including controlling the engine speed to be less than the audible noise-based maximum engine speed when battery power is greater than a minimum threshold.

18 Claims, 3 Drawing Sheets

METHOD AND APPARATUS FOR CONTROLLING OPERATION OF AN INTERNAL COMBUSTION ENGINE FOR A MULTI-MODE POWERTRAIN SYSTEM

TECHNICAL FIELD

The present disclosure relates to internal combustion engines for multi-mode powertrain systems, and control thereof.

BACKGROUND

Multi-mode powertrain systems may include an internal combustion engine (engine) and one or more non-combustion torque machines that generate torque that is transferred through a gear train to a driveline for propulsion when employed on a vehicle. Such powertrain operation may include operating with the engine in either an ON state or an OFF state, wherein operating with the engine in the ON state may include operating the engine to charge an on-board energy storage device that provides power that is consumed by one of the non-combustion torque machines to generate propulsion effort. The engine may operate at speed/load operating points that may generate audible noise and discernible vibrations that are objectionable to passengers or the vehicle operator.

SUMMARY

A multi-mode powertrain system is described, and includes an internal combustion engine and electric machines operative to transfer mechanical power through a gear train to an output member coupled to a driveline, wherein the electric machines electrically connect to a battery. The method includes determining an audible noise-based maximum engine speed, wherein the internal combustion engine generates an audible noise that is less than a threshold noise level when operating at a speed that is less than the audible noise-based maximum engine speed. The electric machines and the internal combustion engine are controlled responsive to an operator torque request including controlling the engine speed to be less than the audible noise-based maximum engine speed when battery power is greater than a minimum threshold.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
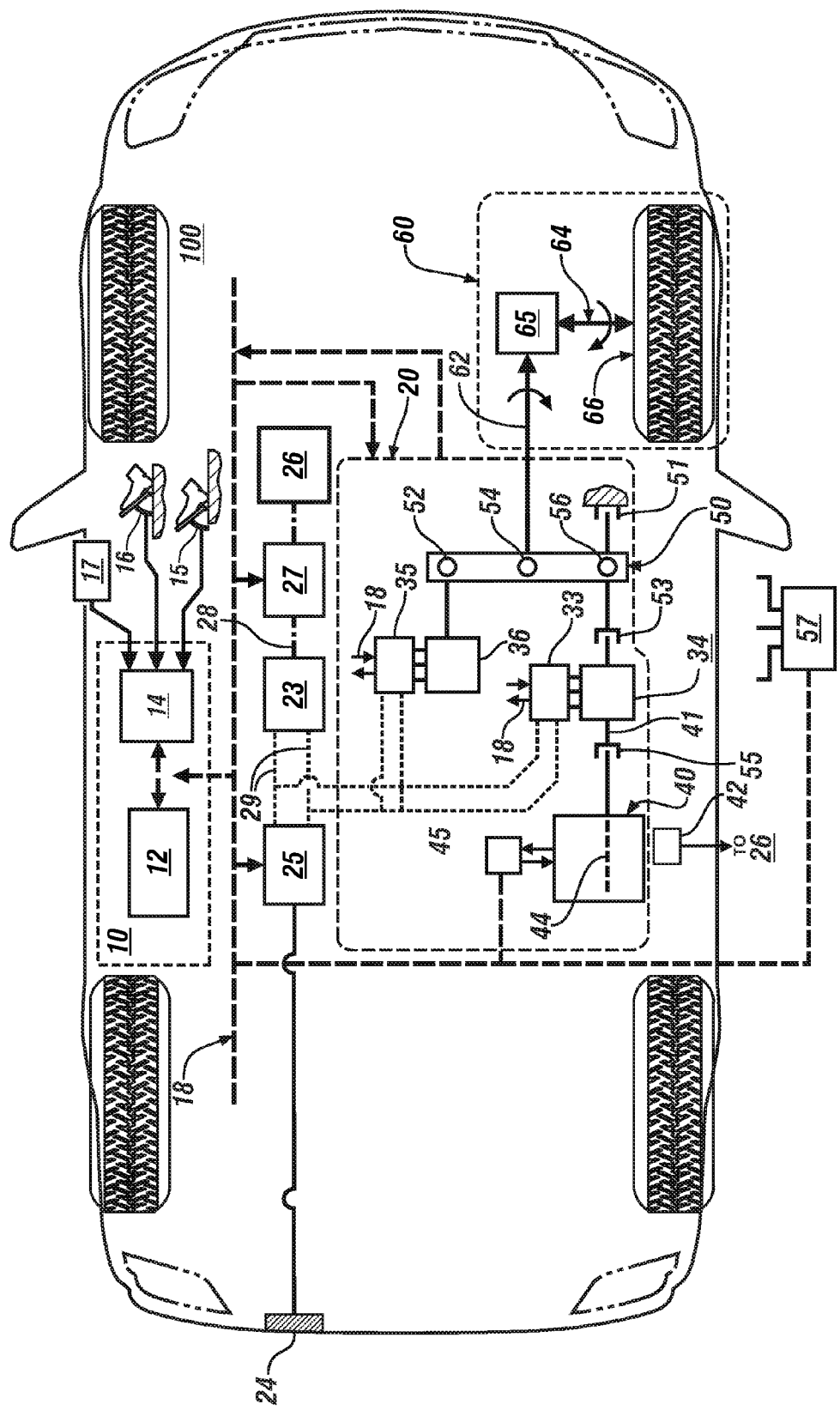
FIG. 1 schematically shows a vehicle including a multi-mode powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including a multi-mode powertrain system 20 coupled to a driveline 60 and controlled by a control system 10. Like numerals refer to like elements throughout the description. The powertrain system 20 includes multiple torque-generating devices including an internal combustion engine (engine) 40 and first and second electrically-powered torque machines (electric machines) 34, 36, respectively, that rotatably couple a gear train 50. An output member 62 couples between the gear train 50 and a driveline 60. Thus, the internal combustion engine 40 and the first and second electric machines 34, 36 couple to the gear train 50 and are controllable to generate an output torque that is transferred to the driveline 60 as propulsion torque for the vehicle 100. Other embodiments of a multi-mode powertrain system that include an internal combustion engine arranged to generate torque that may be employed to generate electric power through an electric machine, and at least one electric machine configured to generate propulsion torque may instead be employed within the scope of this disclosure. By way of definition, 'output torque' refers to positive (tractive) torque and negative (braking) torque that is generated by the powertrain system 20 and is transferred to the output member 62.

One embodiment of the internal combustion engine 40 and the first and second electric machines 34, 36 that couple to the gear train 50 and generate output torque that is transferred to the driveline 60 to generate propulsion torque is now described. A crankshaft 44 of the internal combustion engine 40 couples to an input member 41 that couples to a rotor of the first electric machine 34 via a third clutch 55. An output member from the rotor of the first electric machine 34 couples via a second clutch 53 to a ring gear 56 of the gear train 50. The second electric machine 36 rotatably couples to a sun gear 52 of the gear train 50. A planet gear carrier 54 of the gear train 50 couples via the output member 62 to the driveline 60. The ring gear 56 is couplable via a first clutch/brake 51 to a chassis ground. In one embodiment, the gear train 50 is a simple planetary gear set including sun gear 52, planet gear and carrier 54, and ring gear 56. A transmission controller (TCM) 57 monitors rotational speeds of various rotating members and controls activations of the first, second and third clutches 51, 53 and 55.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form in-cylinder combustion charges that generate an expansion force that is transferred via pistons and connecting rods to the crankshaft 44 to produce torque. Operation of the engine 40 is controlled by an engine controller (ECM) 45. The engine 40 may include a low-voltage solenoid-actuated electrical starter 42 for engine starting in response to a key-crank event in one embodiment. The engine 40 is configured to execute engine stop/start operations, including executing autostart and autostop routines during vehicle operation. The engine 40 may be configured to execute autostart and autostop control routines, fuel cutoff (FCO) control routines and cylinder deactivation control routines during ongoing operation of the powertrain system 20. The engine 40 is considered to be in an OFF state when it is not rotating. The engine 40 is considered to be in an ON state when it is rotating, including one or more FCO states in which it is spinning and unfueled.

The first and second electric machines 34, 36 are preferably high-voltage multi-phase electric motor/generators that electrically connect to a high-voltage energy storage device (battery) 25 via first and second inverter circuits 33, 35, respectively. The first and second electric machines 34, 36 are configured to convert stored electric energy to mechanical power and convert mechanical power to electric energy that may be stored in the high-voltage energy storage device (battery) 25. The battery 25 may be any high-voltage energy storage device, e.g., a multi-cell lithium ion device, an ultracapacitor, or another suitable device without limitation. In one embodiment, the battery 25 may electrically connect via an on-vehicle battery charger 24 to a remote, off-vehicle electric power source for charging while the vehicle 100 is stationary. The battery 25 electrically connects to the first inverter module 33 via the high-voltage DC bus 29 to transfer high-voltage DC electric power to the first electric machine 34 in response to control signals originating in the control system 10. Likewise, the battery 25 electrically connects to the second inverter module 35 via the high-voltage DC bus 29 to transfer high-voltage DC electric power to the second electric machine 36 in response to control signals originating in the control system 10.

Each of the first and second electric machines 34, 36 includes the rotor and a stator, and electrically connects to the high-voltage battery 25 via the corresponding first and second inverter circuits 33, 35, respectively, and the high-voltage DC bus 29. The first and second inverter modules 33, 35 are both configured with suitable control circuits including power transistors, e.g., IGBTs for transforming high-voltage DC electric power to high-voltage AC electric power and transforming high-voltage AC electric power to high-voltage DC electric power. Each of the first and second inverter modules 33, 35 preferably employs pulsewidth-modulating (PWM) control to convert stored DC electric power originating in the high-voltage battery 25 to AC electric power to drive the respective first and second electric machines 34, 36 to generate torque. Similarly, each of the first and second inverter modules 33, 35 converts mechanical power transferred to the respective first and second electric machines 34, 36 to DC electric power to generate electric energy that is storable in the battery 25, including as part of a regenerative power control strategy. The first and second inverter modules 33, 35 are both configured to receive motor control commands and control inverter states to provide the motor drive and regenerative braking functionality. In one embodiment, a DC/DC electric power converter 23 electrically connects to a low-voltage bus 28 and a low-voltage battery 27, and electrically connects to the high-voltage DC bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats, and the low-voltage solenoid-actuated electrical starter 42.

The driveline 60 may include a differential gear device 65 that mechanically couples to an axle, transaxle or half-shaft 64 that mechanically couples to a wheel 66 in one embodiment. The driveline 60 transfers propulsion torque between the gear train 50 and a road surface.

An operator interface 14 of the vehicle 100 includes a controller that signally connects to a plurality of human/machine interface devices through which the vehicle operator commands operation of the vehicle 100. The human/machine interface devices include, e.g., an accelerator pedal 15, a brake pedal 16, a transmission range selector (PRNDL) 17. Other human/machine interface devices preferably include an ignition switch to enable an operator to crank and start the engine 40, a steering wheel, and a headlamp switch. The accelerator pedal 15 provides signal input indicating an accelerator pedal position and the brake pedal 16 provides signal input indicating a brake pedal position. The transmission range selector 17 provides signal input indicating direction of operator-intended motion of the vehicle including a discrete number of operator-selectable positions indicating the preferred rotational direction of the output member 62 in either a forward or a reverse direction.

The control system 10 includes controller 12 that signally connects to the operator interface 14. The controller 12 preferably includes a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the high-voltage battery 25, the first and second inverter modules 33, 35, the ECM 45 and the TCM 57, either directly or via a communications bus 18 to monitor and control operation thereof.

The controller 12 commands operation of the powertrain system 20, including selecting and commanding operation in one of a plurality of operating modes to generate and transfer torque between the torque generative devices, e.g., the engine 40 and the first and second electric machines 34, 36 and the driveline 60. The operating modes preferably include one or more electric-vehicle (EV) modes wherein the engine 40 is in the OFF state and the first and/or the second electric machines 34, 36 generate propulsion torque. The operating modes preferably also include an electrically-variable mode wherein the engine 40 and one or both of the first and second electric machines 34, 36 generate propulsion torque. The operating modes preferably also include an extended-range EV mode wherein the engine 40 is in the ON state and generating electric power through the first electric machine 34 and the second electric machine 36 is generating propulsion torque. The extended-range EV mode, the EV mode and the electrically-variable mode each have an associated battery charging mode that may be either a charge-sustaining mode or a charge-depleting mode. The charge-depleting mode may include operating with the engine 40 in the OFF state, and the charge-sustaining mode include operating with the engine 40 in the ON state. The charge-sustaining mode indicates powertrain operation wherein a state of charge (SOC) of the battery 25 is preferably maintained at a predetermined level with a possibility of short-term variations associated with vehicle operation. The charge-depleting mode indicates powertrain operation wherein SOC of the battery 25 is preferably depleted at a predetermined rate, with a possibility of short-term variations associated with vehicle operation.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event.

The powertrain system 20 includes a communications scheme including the communications bus 18 to effect communications in the form of sensor signals and actuator command signals between the control system 10, the vehicle 100 and the powertrain system 20. The communications scheme employs one or more communications systems and devices, including, e.g., the communications bus 18, a direct connection, a local area network bus, a serial peripheral interface bus, and wireless communications to effect information transfer. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
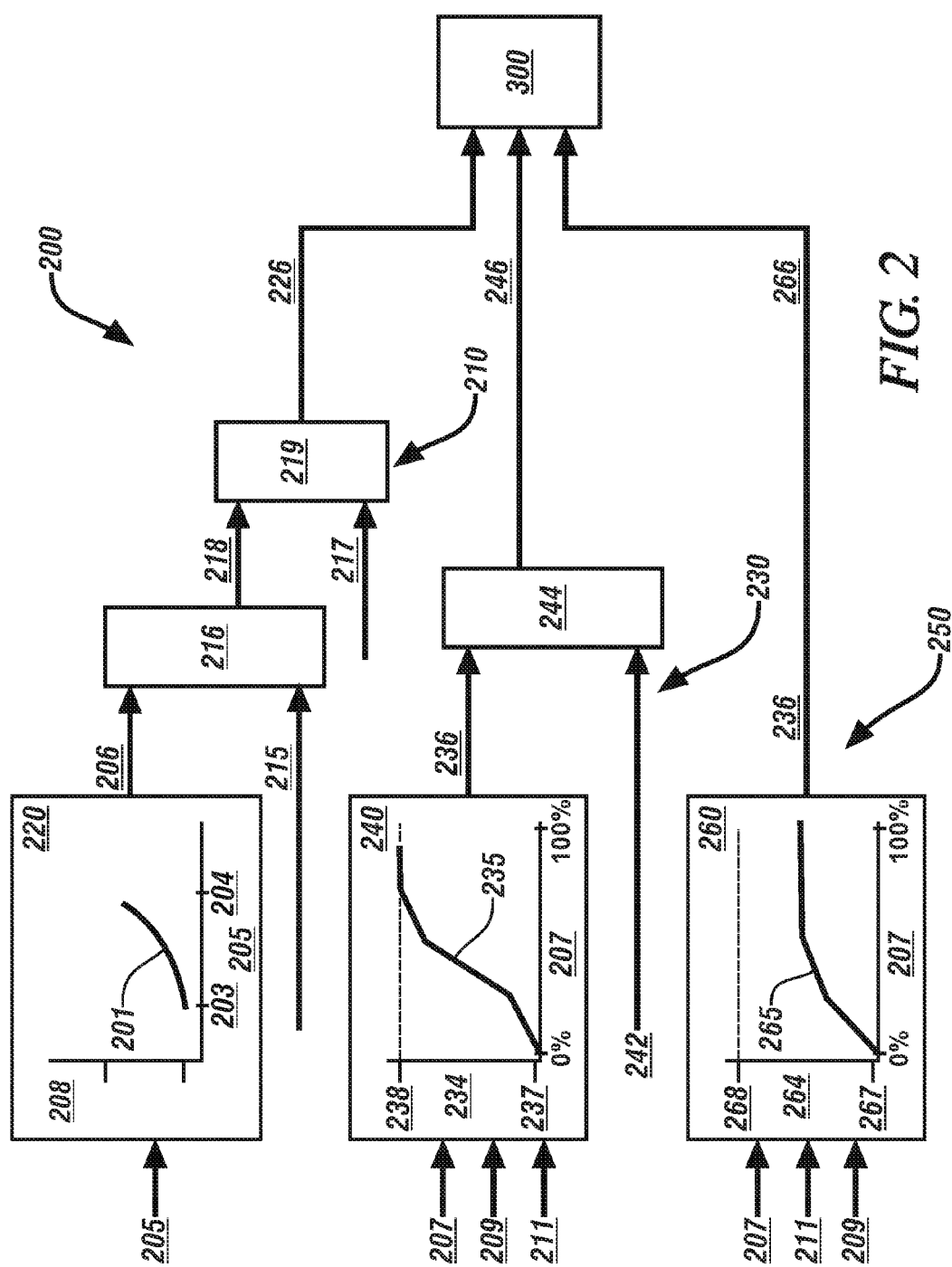
FIG. 2 schematically shows an input parameter process for determining input parameters for an executable search routine, in accordance with the disclosure.
Figure 3:
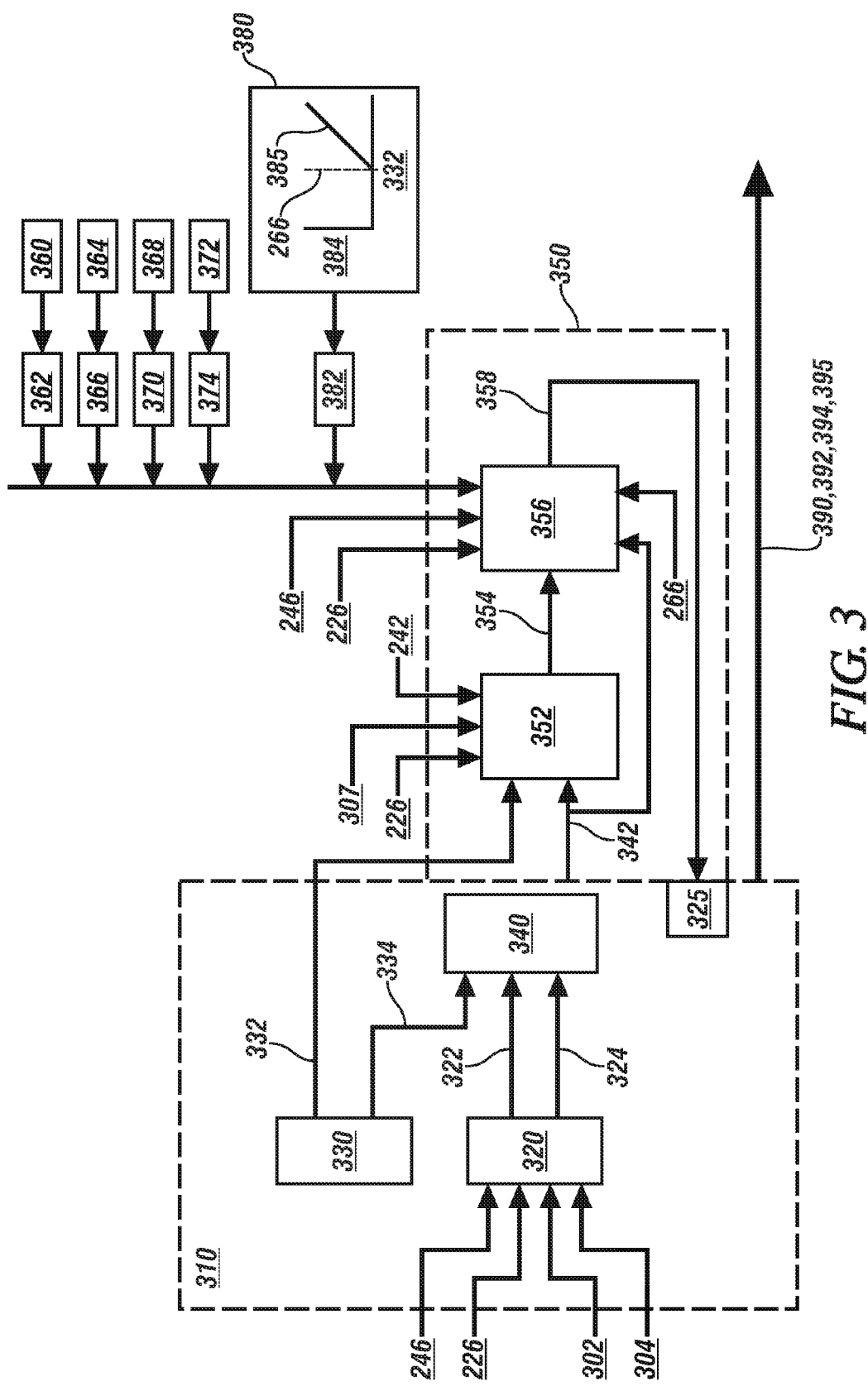
FIG. 3 schematically shows an executable search routine for dynamically determining a preferred input speed from the engine and a preferred output torque from the transmission that are responsive to the operator torque request and minimize the likelihood of occurrence of operating the engine at an input speed that is related to undesirable engine noise, vibration or harshness (NVH) when the SOC of the battery is within a normal range, in accordance with the disclosure.

FIG. 2 schematically shows an input parameter process 200 for determining input parameters for an executable search routine 300 shown schematically with reference to FIG. 3. The input parameter process 200 includes executable control routines and calibrations for dynamically determining a noise, vibration or harshness (NVH) limited maximum input speed 266 from the engine 40, a modifiable output torque request 246 from the powertrain 20 to the driveline 60, and a maximum battery power 226, which may be employed to control an embodiment of the powertrain system 20 described with reference to FIG. 1. The executable search routine 300 described with reference to FIG. 3 relates to selecting a preferred input speed and torque from the engine 40 that are responsive to the operator torque request and achieve an input speed that minimizes the likelihood of occurrence of undesirable engine-based NVH during specified operating conditions. Instead, the preferred input speed and torque are selected to be responsive to the operator torque request and to achieve an input speed that generates engine noise that may be masked by an expected road noise generated by the driveline 60 of the vehicle 100 when the powertrain system 20 is generating the preferred output torque, so long as no other limits such as battery power limits are violated by operating in that manner.

A maximum input speed routine (routine) 250 may be executed to determine the NVH-limited maximum input speed 266 from the engine 40 to the gear train 50. The NVH-limited maximum input speed 266 from the engine 40 is an audible noise-based maximum engine speed that may be calibrated. The engine 40 generates an audible noise that is less than a threshold noise level when operating at a speed that is less than the audible noise-based maximum engine speed. Routine 250 includes monitoring an accelerator pedal position (APP) 207, which may be a signal input from the accelerator pedal 15 that may be interpreted as a percentage of a maximum or wide-open throttle position. Routine 250 also includes monitoring a battery discharging mode 211, i.e., either the charge depletion mode or the charge sustaining mode, and monitoring a transmission output speed 209. Other parameters may also be monitored, such as any parameter indicating that the engine 40 is in the ON state. When the input speed limiting routine 250 indicates that the powertrain system 20 is operating in the charge sustaining mode, or in the charge-depletion mode with the engine in the ON state, an NVH-based input speed calibration 260 is selected as shown. The NVH-based input speed calibration 260 indicates an NVH-based maximum speed 265 that is determined in relation to APP 207, which is shown on the horizontal axis over a range between 0%, which may be referred to as a closed throttle condition, and 100%, which may be referred to as a wide-open throttle condition. A range of engine speed 264 is shown on the vertical axis between idle speed 267 and redline speed 268. As shown, the NVH-limited maximum input speed 266 from the engine may be substantially less than the engine redline speed 268 when the powertrain system 20 is operating in the charge sustaining mode or in the charge-depletion mode with the engine in the ON state. Values for the NVH-based maximum speed 265 that are employed in the NVH-based input speed calibration 260 may be specific to a vehicle and powertrain configuration, and are preferably determined during vehicle and powertrain development. The NVH-limited maximum input speed 266 from the engine 40 is an audible noise-based maximum engine speed, wherein the engine 40 generates an audible noise that is less than a threshold audible noise level when operating at a speed that is less than the NVH-based maximum speed 265. Routine 250 generates a state for the NVH-limited maximum input speed 266 based upon the NVH-based maximum speed 265 and the APP 207.

A modified torque request routine (routine) 230 may be executed to determine the preferred output torque request 246 for controlling operation of the powertrain system 20 to generate propulsion torque that is transferred to the driveline 60. Routine 230 includes monitoring the APP 207, the transmission output speed 209, the battery discharging mode 211, i.e., either the charge depletion mode or the charge sustaining mode. When the modified torque request routine 230 indicates that the powertrain system 20 is operating in the charge sustaining mode, or in the charge-depletion mode with the engine 40 in the ON state, a modified output torque request calibration 240 is selected.

The modified output torque request calibration 240 indicates a modified output torque request 236 that is preferably determined in relation to APP 207, which is shown on the horizontal axis over a range between 0% and 100%. A range of the modified output torque 234 is shown on the vertical axis between a minimum output torque 237 and a maximum output torque 238. The modified output torque 236 may differ from the output torque when the powertrain system 20 is operating in the charge sustaining mode or in the charge-depletion mode with the engine in the ON state. The modified output torque request calibration 240 includes output torque values 235 that are employed in the modified output torque request calibration 240 that may be specific to a vehicle and powertrain configuration, and are preferably determined during vehicle and powertrain development. Routine 230 generates a state for the modified output torque 236 based upon the transmission output speed 209 and the APP 207 employing the modified output torque request calibration 240. The state for the modified output torque 236 is compared (244) with an operator torque request 242 that is determined based upon the APP 207, and a minimum of the modified output torque 236 and the operator torque request 242 is selected as the preferred output torque request 246. The output torque values including the preferred output torque request 246 are preferably in units of newton-meters (N-m).

A battery power routine (routine) 210 may be executed to determine a preferred maximum battery power 226 that is employed for controlling operation of the powertrain system 20 to generate output torque that is transferred to the driveline 60 for propulsion. Routine 210 includes monitoring an SOC 205 of the battery 25 and the battery discharging mode 211, i.e., one of the charge depletion mode or the charge sustaining mode. When the modified torque request routine 230 indicates that the powertrain system 20 is operating in the charge sustaining mode, or in the charge-depletion mode with the engine in the ON state, a battery power calibration 220 is selected.

The battery power calibration 220 indicates a first battery power 206 that is preferably determined in relation to the SOC 205, which is shown on the horizontal axis over a range between a minimum SOC 203 and a maximum SOC 204, both of which are specific to the battery 25. A range of battery powers 208 are shown on the vertical axis. The battery power calibration 220 includes battery power values 201 that may be specific to a vehicle and a powertrain configuration, and are preferably determined during vehicle and powertrain development. Routine 210 generates a maximum battery power 206 based upon the SOC 205 employing the battery power calibration 220. The first battery power 206 is compared (216) with a minimum power limit 215, and a maximum value of the first battery power 206 and the minimum power limit 215 is selected as a first power limit 218. The first power limit 218 is compared (219) with a maximum power limit 217, and the preferred maximum battery power 226 is selected as a minimum of the first power limit 218 and the maximum power limit 217. The maximum power limit 217 may be based upon a determination of power limits related to those affecting service life of the battery 25. The power values, including the preferred maximum battery power 226, are preferably in units of kilowatts (kW). As is appreciated, the terms related to battery power may relate to either charging or discharging the battery 25, and the maximum battery power terms employed herein preferably relate to battery discharging, with such discharging related to operating one of the electric machine(s) 34, 36 to generate torque.

FIG. 3 schematically shows an embodiment of the executable search routine 300 for dynamically determining a preferred input speed 392 and a preferred input torque 394 from the engine 40 (390) that are responsive to the operator torque request 242 and minimize the likelihood of operating the engine 40 at an input speed that is related to undesirable engine noise, vibration or harshness (NVH) when the SOC of the battery 25 is within a normal range, which may include powertrain operation when charging is not commanded. The executable search routine 300 employs inputs including the NVH-limited maximum input speed 266, the preferred output torque request 246 and the maximum battery power 226, which may be dynamically determined as described with reference to FIG. 2.

The search routine 300 includes a two-dimensional search engine (search engine) 310, a calculation loop 350, and an evaluation routine 325 for dynamically determining the preferred input speed 392 and the preferred input torque 394 from the engine 40 390. The search engine 310 may include a golden section search or another suitable iterative search engine for generating candidate input speeds Ni(j) 332 and candidate engine torque states Te(j) 342 for evaluation. The designation (j) indicates an individual iteration. The search engine 310 includes a candidate input speed generator 330 that iteratively generates candidate input speed states Ni(j) 332 and related ratios(j) 334. The candidate input speeds Ni(j) 332 are selected to increment within a range from a minimum speed to a maximum speed, e.g., idle to redline speed. The candidate input speeds Ni(j) 332 may include speed values that increment within the range, e.g., idle (1000 rpm), 1100 rpm, 1200 rpm, . . . redline. The search engine 310 further includes a candidate engine torque generator 340 that iteratively generates candidate engine torque states Te(j) 342 based upon a minimum engine torque 322 and a maximum engine torque 324 that are normalized employing the ratio(j) 334. The minimum engine torque 322 and maximum engine torque 324 are determined (320) based upon the preferred output torque request 246 and the maximum battery power 226 that are dynamically determined as described with reference to FIG. 2, taking into account engine limits 302 and electric machine limits 304 associated with available power and hardware capabilities.

Each iteration, the candidate input speed state Ni(j) 332 and the candidate engine torque state Te(j) 342 are provided as inputs to the calculation loop 350. The calculation loop 350 employs a system torque determination scheme 352 and a cost model 356 to calculate a candidate cost Pcost(j) 358 operating the powertrain system with the engine operating at each candidate input speed state Ni(j) 332 and each candidate engine torque state Te(j) 342. The evaluation routine 325 monitors the candidate costs Pcost(j) 358 for all iterations. The candidate input speed state Ni(j) 332 and the candidate engine torque state Te(j) 342 that achieve a minimum of the candidate costs Pcost(j) 358 responsive to the output torque request are selected by the evaluation routine 325 as the preferred input speed 392 and preferred engine torque 394 (390). The preferred input speed 392, the preferred engine torque 394 and associated preferred motor torque commands Ta, Tb 395 are identified based upon execution of a plurality of iteration loops across the available input speed range and the available output torque range.

Inputs to the system torque determination scheme 352 include the candidate input speed state Ni(j) 332, the candidate engine torque state Te(j) 342, the maximum battery power 226, the output torque request 242, and an operating mode for the powertrain system 307, e.g., one of the EV mode, the extended-range EV mode, and the electrically-variable mode, as previously described.

The powertrain system 20 has known power/torque and speed relationships for each of the operating modes 307. Such power/torque and speed relationships for each of the operating modes are known and not described in detail herein. The known power/torque relationships may be reduced to control routines by which the known states for the maximum battery power 226, the output torque request To 242, and the operating mode 307 in conjunction with the candidate input speed state Ni(j) 332 and the candidate engine torque state Te(j) 342 may be employed to calculate candidate motor torque commands Ta(j), Tb(j) for the first and second electric machines 34, 36. The candidate motor torque commands Ta(j), Tb(j) are those commands that achieve an output torque To(j) that is responsive to the output torque request To 242 when operating in the selected operating mode 307, as limited by the preferred maximum battery power 226, referred to as powertrain operating point 354.

The powertrain operating point 354 output from the system torque determination scheme 352, including the candidate input speed Ni(j) 332, the candidate engine torque state Te(j) 342, preferred motor torque commands Ta(j), Tb(j) for the first and second electric machines 34, 36, the output torque request To 242 and the selected operating mode 307 are provided as inputs to a cost model 356. Other inputs to the cost model 356 include the NVH-limited maximum input speed 266, the preferred output torque request 246 and the maximum battery power 226.

The cost model 356 includes a power cost function that determines a candidate cost P(j) 358 for operating the powertrain 20 at the candidate powertrain operating point 354. The costs relate to prioritized costs associated with states of various operations for the powertrain system 20, and include, by way of example, costs associated with hardware limits 360, output torque 364, SOC 368, efficiency 372 and NVH 380. In general, lower costs may be associated with lower fuel consumption at high conversion efficiencies, lower battery power usage, lower input speeds, lower emissions and other factors. As such, costs associated with the hardware limits 360 include assigning higher costs to operating conditions when one or more of the powertrain components or systems is at or near a maximum or minimum allowable state for an operating parameter, such as discharging the battery 25 to a maximum battery power limit. Costs associated with the output torque 364 include assigning higher costs to operating conditions when one or more of the powertrain components or systems is at or near a maximum output torque. Costs associated with the output torque 364 also include assigning higher costs to operating conditions when the powertrain system is unable to produce the request output torque at the operating point being evaluated. Costs associated with the SOC 368 include assigning higher costs to operating conditions when the battery SOC is at or near a maximum or minimum SOC. Costs associated with the efficiency 372 include assigning higher costs to operating conditions when one or more of the powertrain components or systems is at or near a low operating efficiency. The costs associated with NVH 380 includes assigning higher costs to operating conditions when one or more of the powertrain components or systems is at or near a condition that induces increased NVH.

An example of the cost associated with NVH 380 is depicted graphically, and includes cost 384 on the vertical axis in relation to candidate input speed 332, which is shown on the horizontal axis, and NVH cost 385 plotted thereon. When the candidate input speed 332 is less than the NVH-limited maximum input speed 266, the NVH cost 385 is at a minimum or zero. When the candidate input speed 332 exceeds the NVH-limited maximum input speed 266, the NVH cost 385 increases in relation to the candidate input speed 332 with the magnitude of the cost related to the vehicle output speed. Thus, the calculation loop 350 assigns no cost associated with NVH so long as the candidate input speed 332 is less than the NVH-limited maximum input speed 266. However, cost associated with NVH increases at candidate input speeds that are greater than the NVH-limited maximum input speed 266, thus reducing the likelihood that a candidate speed greater than the NVH-limited maximum input speed 266 is selected when operating the powertrain system 20 with the SOC for the battery 25 within an expected normal range for SOC.

Each of the costs of the powertrain system 20 has an associated weighting factor that may be selectable based upon operating conditions. The weighting factors include a hardware weighting factor 362 for the hardware limits 360, an output torque weighting factor 366 for the output torque 364, an SOC weighting factor 370 for the SOC 368, an efficiency weighting factor 374 for the efficiency 372 and a NVH weighting factor 382 for the NVH 380. The power costs are determined based upon factors related to vehicle drivability, fuel economy, emissions, battery usage, and durability.

Under system operating conditions that include operating the powertrain system 20 with the SOC for the battery 25 within an expected normal range, i.e., greater than a lower SOC threshold, the weighting factors 362, 366, 370, 374 and 382 have a first priority ranking that preferably includes, from greatest to least, the hardware weighting factor 362, the NVH weighting factor 382, the output torque weighting factor 366, the SOC weighting factor 370 and the efficiency weighting factor 374. Under system operating conditions that include operating the powertrain system 20 with the SOC for the battery 25 approaching a lower SOC threshold, the weighting factors 362, 366, 370, 374 and 382 have a second, different priority ranking that preferably includes, from greatest to least, the hardware weighting factor 362, the SOC weighting factor 370, the output torque weighting factor 366, the NVH weighting factor 382 and the efficiency weighting factor 374. The preferred output torque request 246 and the SOC for the battery 25 in relation to its lower SOC threshold are the primary drivers for setting the priority rankings of the weighting factors 362, 366, 370, 374 and 382. As such, the cost effect of NVH 380 is greater when operating the powertrain system 20 with the SOC for the battery 25 within the expected normal range than when operating the powertrain system 20 with the SOC for the battery 25 approaching the lower SOC threshold. Thus, as the SOC for the battery 25 reduces, e.g., in response to cold ambient temperatures, engine speed may increase and produce more audible noise. As SOC approaches the lower SOC threshold, battery discharge limits are reduced by incurring large battery power costs, which increases engine speed to allow the system to charge the battery 25 before SOC reaches the lower SOC threshold. Magnitudes of the aforementioned weighting factors are specific to a powertrain application, and may be selected during system development. Thus, when the operating conditions include operating the powertrain system 20 with the SOC for the battery 25 within an expected normal range, i.e., greater than a lower SOC threshold, the powertrain system 20 may be capable of achieving the preferred output torque request 246 with the engine 40 operating at the NVH-limited maximum input speed 266. However, under other conditions outside the expected normal range, the powertrain system 20 may be incapable of achieving the preferred output torque request 246 with the engine 40 operating at the NVH-limited maximum input speed 266. Furthermore, when the SOC approaches the lower SOC threshold, the powertrain system 20 may be incapable of achieving the preferred output torque request 246 with the engine 40 operating at the NVH-limited maximum input speed 266. Furthermore, when the battery SOC is approaching the lower SOC threshold, the battery power limit will be modified thus forcing the powertrain system 20 into charging mode, thus requiring increase engine speed to effect the battery charging and meet the preferred output torque request 246.

The cost effect of NVH 380 is amplified by the relatively high priority ranking of the NVH weighting factor 382 when the SOC for the battery 25 is within the expected normal range, i.e., greater than a lower SOC threshold. In contrast, the cost effect of NVH 380 is diminished by the relatively low priority ranking of the NVH weighting factor 382 when the SOC for the battery 25 is approaching the lower SOC threshold. As such, the evaluation routine 325 selects a preferred input speed from the engine 40 and a preferred engine torque that are responsive to the operator torque request 242 and minimize the likelihood of operating the engine 40 at an input speed that is related to undesirable NVH when the SOC of the battery 25 is within the normal range.

The candidate cost Pcost(j) 358 is determined by combining the various costs associated with hardware limits 360, output torque 364, SOC 368, efficiency 372 and NVH 380 with associated hardware weighting factor 362, output torque weighting factor 366, SOC weighting factor 370, efficiency weighting factor 374, and NVH weighting factor 382.

The preferred input speed 392, the preferred engine torque 394 from the engine 40 and the associated preferred motor torque commands Ta, Tb 395 for the first and second electric machines 34, 36 are communicated to the controller 12 for implementation through the first and second inverter modules 33, 35, the ECM 45 and the TCM 57 during a subsequent execution interval. Thus, under normal driving conditions, the control system has the ability to shape the engine speed response to a desired profile, based on the SOC, vehicle speed, and operator input to the accelerator pedal.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a powertrain system including an internal combustion engine and electric machines operative to transfer mechanical power through a gear train to an output member coupled to a driveline, wherein the electric machines electrically connect to a battery, the method comprising:
determining an audible noise-based maximum engine speed, wherein the engine generates an audible noise that is less than a threshold noise level when operating at a speed that is less than the audible noise-based maximum engine speed; and
controlling the electric machines and the engine responsive to an operator torque request including controlling the engine speed to be less than the audible noise-based maximum engine speed when battery power is greater than a minimum threshold, wherein controlling the engine speed to be less than the audible noise-based maximum engine speed when the battery power is greater than a minimum threshold comprises:
determining an input speed range between an idle speed and a maximum speed from the engine,
determining an engine torque range based upon the operator torque request and the battery power,
selecting a plurality of candidate input speeds within the input speed range,
selecting a plurality of candidate engine torques within the engine torque range,
executing a system torque determination scheme to determine preferred motor torque commands for the electric machines and an output torque when operating the powertrain system responsive to the operator torque request with the engine operating at each of the candidate input speeds and each of the candidate engine torques,
executing a cost model to determine a candidate cost for operating the powertrain system with the engine operating at each of the candidate input speeds and at each of the candidate engine torques and the electric machines operating at the corresponding preferred motor torque commands,
identifying, as a preferred input speed and a preferred engine torque, one of the candidate input speeds and one of candidate engine torques that achieve a minimum of the candidate costs and is responsive to the operator torque request, and
controlling the engine responsive to the preferred input speed and the preferred engine torque.

2. The method of claim 1, wherein controlling the electric machines and the engine responsive to an operator torque request comprises controlling torque outputs from the electric machines and the engine responsive to the operator torque request.

3. The method of claim 1, wherein executing the cost model to determine a candidate cost for operating the powertrain system with the engine operating at each of the candidate input speeds and at each of the candidate engine torques and the electric machines operating at the corresponding preferred motor torque commands comprises:
determining a cost associated with NVH (noise-vibration-harshness) for the candidate input speed; and
determining the candidate cost based upon the cost associated with NVH.

4. The method of claim 3, wherein determining the cost associated with NVH for the candidate input speed comprises assigning zero cost associated with NVH when the candidate input speed is less than the audible noise-based maximum engine speed.

5. The method of claim 3, wherein determining the cost associated with NVH for the candidate input speed comprises assigning an increasing cost associated with NVH when the candidate input speed is greater than the audible noise-based maximum engine speed.

6. The method of claim 1, wherein executing the cost model to determine a candidate cost for operating the powertrain system with the engine operating at each of the candidate input speeds and at each of the candidate engine torques and the electric machines operating at the corresponding preferred motor torque commands comprises:

determining costs associated with hardware limits, output torque, a battery state of charge, efficiency and NVH for operating the powertrain system with the engine operating at each of the candidate input speeds and at each of the candidate engine torques and the electric machines operating at the corresponding preferred motor torque commands;

assigning weighting factors to each of the hardware limits, output torque, battery state of charge, efficiency and NVH; and determining the candidate cost by combining the costs associated with hardware limits, output torque, battery state of charge, efficiency and NVH with the corresponding assigned weighting factor.

7. The method of claim 6, wherein the weighting factor for NVH is assigned a high priority ranking when the battery power is greater than the minimum threshold.

8. The method of claim 6, wherein the weighting factor for NVH is assigned a low priority ranking when the battery power is less than the minimum threshold.

9. The method of claim 1, wherein the audible noise-based maximum engine speed comprises an engine speed at which generated engine noise is masked by an expected road noise generated by the driveline.

10. A method for controlling a powertrain system including an internal combustion engine, first and second electric machines, a gear train, and a battery supplying electric power to the first and second electric machines, the powertrain system operative to transfer mechanical power generated by one of the first and second electric machines through the gear train to an output member, the method comprising:

determining an audible noise-based maximum engine speed, wherein the engine generates an audible noise that is less than a threshold noise level when operating at a speed that is less than the audible noise-based maximum engine speed; and controlling the engine speed to be less than the audible noise-based maximum engine speed when the electric power supplied from the battery to the first and second electric machines is greater than a minimum threshold, including:

determining an input speed range between an idle speed and a maximum speed from the engine, determining an engine torque range based upon the operator torque request and the battery power, selecting a plurality of candidate input speeds within the input speed range, selecting a plurality of candidate engine torques within the engine torque range, executing a system torque determination scheme to determine preferred motor torque commands for the electric machines and an output torque when operating the powertrain system responsive to the operator torque request with the engine operating at each of the candidate input speeds and each of the candidate engine torques, executing a cost model to determine a candidate cost for operating the powertrain system with the engine operating at each of the candidate input speeds and at each of the candidate engine torques and the electric machines operating at the corresponding preferred motor torque commands, identifying, as a preferred input speed and a preferred engine torque, one of the candidate input speeds and one of candidate engine torques that achieve a minimum of the candidate costs and is responsive to the operator torque request, and controlling the engine responsive to the preferred input speed and the preferred engine torque.

11. The method of claim 10, wherein executing the cost model to determine a candidate cost for operating the powertrain system with the engine operating at each of the candidate input speeds and at each of the candidate engine torques and the electric machines operating at the corresponding preferred motor torque commands comprises:

determining a cost associated with NVH (noise-vibration-harshness) for the candidate input speed; and determining the candidate cost based upon the cost associated with NVH.

12. The method of claim 11, wherein determining the cost associated with NVH for the candidate input speed comprises assigning zero cost associated with NVH when the candidate input speed is less than the audible noise-based maximum engine speed.

13. The method of claim 11, wherein determining the cost associated with NVH for the candidate input speed comprises assigning an increasing cost associated with NVH when the candidate input speed is greater than the audible noise-based maximum engine speed.

14. The method of claim 10, wherein executing the cost model to determine a candidate cost for operating the powertrain system with the engine operating at each of the candidate input speeds and at each of the candidate engine torques and the electric machines operating at the corresponding preferred motor torque commands comprises:

determining costs associated with hardware limits, output torque, a battery state of charge, efficiency and NVH for operating the powertrain system with the engine operating at each of the candidate input speeds and at each of the candidate engine torques and the electric machines operating at the corresponding preferred motor torque commands;

assigning weighting factors to each of the hardware limits, output torque, battery state of charge, efficiency and NVH; and determining the candidate cost by combining the costs associated with hardware limits, output torque, battery state of charge, efficiency and NVH with the corresponding assigned weighting factor.

15. The method of claim 14, wherein the weighting factor for NVH is assigned a high priority ranking when the battery power is greater than the minimum threshold.

16. The method of claim 14, wherein the weighting factor for NVH is assigned a low priority ranking when the battery power is less than the minimum threshold.

17. The method of claim 10, wherein the audible noise-based maximum engine speed comprises an engine speed at which generated engine noise is masked by an expected road noise generated by the driveline.

18. A powertrain system for a vehicle, comprising:

an internal combustion engine and first and second electric machines mechanically coupled to a gear train, wherein the gear train is coupled to a driveline of the vehicle;

a battery electrically connected to the first and second electric machines, a controller operatively connected to the internal combustion engine and the first and second electric machines, the controller including an instruction set, the instruction set executable to:

determine an audible noise-based maximum engine speed, wherein the engine generates an audible noise that is less than a threshold noise level when operating at a speed that is less than the audible noise-based maximum engine speed, and control the electric machines and the engine responsive to an operator torque request including controlling the engine speed to be less than the audible noise-based maximum engine speed when battery power is greater than a minimum threshold, which includes an instruction set executable to:

determine an input speed range between an idle speed and a maximum speed from the engine, determine an engine torque range based upon the operator torque request and the battery power, select a plurality of candidate input speeds within the input speed range, select a plurality of candidate engine torques within the engine torque range, execute a system torque determination scheme to determine preferred motor torque commands for the electric machines and an output torque when operating the powertrain system responsive to the operator torque request with the engine operating at each of the candidate input speeds and each of the candidate engine torques, execute a cost model to determine a candidate cost for operating the powertrain system with the engine operating at each of the candidate input speeds and at each of the candidate engine torques and the electric machines operating at the corresponding preferred motor torque commands, identify, as a preferred input speed and a preferred engine torque, one of the candidate input speeds and one of candidate engine torques that achieve a minimum of the candidate costs and is responsive to the operator torque request, and control the engine responsive to the preferred input speed and the preferred engine torque.

* * * * *